United States Patent

Chen

[15] 3,696,811

[45] Oct. 10, 1972

[54] PERIODONTAL BANDAGE AND BACKING THEREFOR

[72] Inventor: James Ling Chen, East Brunswick, N.J.

[73] Assignee: E. R. Squibb & Sons, Inc., New York, N.Y.

[22] Filed: June 17, 1971

[21] Appl. No.: 154,147

Related U.S. Application Data

[63] Continuation-in-part of Ser. No. 833,140, June 13, 1969, abandoned.

[52] U.S. Cl. .................... 128/156, 128/260, 424/28, 424/38
[51] Int. Cl. ........................... A61l 15/00, A61m 7/00
[58] Field of Search ........ 128/156, 260, 268; 424/28, 424/34, 38, 77, 363

[56] References Cited

UNITED STATES PATENTS

| | | | |
|---|---|---|---|
| 315,691 | 4/1885 | Abbott | 424/28 |
| 3,249,109 | 5/1966 | Maeth et al | 128/268 |
| 3,339,546 | 9/1967 | Chen | 128/156 |
| 3,444,858 | 5/1969 | Russell | 128/260 |

*Primary Examiner*—Charles F. Rosenbaum
*Attorney*—Lawrence S. Levinson et al. and Theodore J. Criares

[57] ABSTRACT

A hard but pliable backing for a periodontal bandage is formed from a composition comprising by weight from about 40–50 percent beeswax, from 25–30 percent terpene resin, and from 20–25 percent filler.

8 Claims, No Drawings

PERIODONTAL BANDAGE AND BACKING THEREFOR

This application is a continuation-in-part of copending application Serial No. 833,140, filed June 13, 1969 now abandoned.

BACKGROUND OF THE INVENTION

Periodontal bandages have been prepared from a water impervious film having secured to one surface thereof a water soluble or swellable hydrocolloid admixed with a water insoluble viscous gum-like elastic binder. Good results have been obtained with such bandages in that they adhere to body surfaces, particularly to moist body surfaces, and most particularly, to internal moist surfaces of the oral cavity. Such bandages are soft, pliable, and easy to apply, and when applied, conform to the configuration of the surface upon which they are applied. This is especially important in the case of application to an internal surface of the oral cavity. Such bandages have no odor or taste, and once applied, will not peel off, chip off, or fall off for an extended period of time, and will remain in position through such activities such as eating, drinking, speaking, sleeping, without any signs of irritation or toxicity. In addition to their unique adhering properties, such bandages have been found to promote the healing of the areas treated therewith and to reduce the time for healing from days to hours in some cases of intra-oral use.

In some cases, however, it has been found that the water impervious film separates prematurely from the adhesive bonding composition whereby the latter is exposed to moisture present in the oral cavity. In the absence of the water impervious film, the adhesive bonding composition is exposed to moisture in the oral cavity and undergoes gradual attrition.

It is, accordingly, an object of the present invention to provide a novel backing for a periodontal bandage. Another object is to provide a periodontal bandage wherein premature loss of the backing is prevented. A further object is to provide a hard but pliable backing for a periodontal adhesive. These and other objects of the present invention will be apparent from the following description.

SUMMARY OF THE INVENTION

A backing for a periodontal bandage comprises, by weight, from about 40–50 percent beeswax, from about 25–30 percent terpene resin, and from about 20–25 percent filler. Other materials may be present, such as, for example, coloring agents, pigments, preservatives, anti-oxidants, etc.

DETAILED DESCRIPTION

The backing must strengthen and protect the bonding adhesive, and attach itself firmly to the bonding adhesive to prevent premature loss of the backing and subsequent attrition of the bonding adhesive by moisture. The backing must be hard enough to withstand the pressure generated during chewing of food or licking by the tongue, yet soft enough to conform to the configuration of the intra-oral surface, such as teeth and gums. It should not be brittle or crack on standing or when bent, either at room temperature or slightly below.

The backing comprises a mixture of beeswax, terpene resin, and filler. The beeswax is present in a quantity of from about 40–50 percent by weight. The terpene resin may be any of the various polymerization products of the terpene hydrocarbons. The terpenes are unsaturated cyclic hydrocarbons of which the following are representative: $\alpha$-pinene; $\beta$-pinene; dipentene; terpinolene; 3,8-p-menthadiene; $\alpha$-phellandrene; and $\alpha$-terpinene. Also suitable are modified terpenes such as terpene-phenolic resins which may be made by reacting terpenes or terpene alcohols with phenol. The terpene resin, or modified terpene resin, is present in an amount of from about 25–30 percent by weight. Fillers are present in an amount from about 20–25 percent by weight. The function of the filler is to increase the hardness of the backing. Various materials which are substantially inert when introduced into the oral cavity may be employed as filler. In general the filler is a water insoluble, fine, powdered mineral. Examples of suitable fillers are clay, silicon dioxide, kieselguhr, barium sulfate, diatomaceous earth and talc. Kaolin, a clay, is a preferred filler.

Other materials such as pigments and coloring agents may also be present in amounts from about 0.5–1.5 percent by weight. Additives such as preservatives, stabilizers, or anti-oxidants for the terpene resin may also be present in amounts from about 0.05–0.5 percent by weight.

A backing conforming to the foregoing formulation may be melted at moderately elevated temperatures and spread on a sheet of bonding adhesive in a layer having the desired thickness. After the backing has solidified, the sheet may be cut into desired sizes.

The adhesive bonding compositions which may be employed in the practice of this invention are those which have been found, either alone or in combination with other like compositions, to adhere to body surfaces. The adhesive bonding compositions may comprise a water soluble or swellable hydrocolloid or mixtures thereof, such as polyvinylalcohol, powdered pectin, gelatin, carboxymethylcellulose, high molecular weight carbowax, carboxypolymethylene and other like substances, which hydrocolloids or mixtures thereof are incorporated in a natural or synthetic viscous gum-like substance such as natural rubber, silicone rubber, acrylonitrile rubber, polyurethane rubber, polyisobutylene, sucrose acetate isobutylate and other like substances. The viscous gum-like substance acts as a binder for the hydrocolloid particles and, in addition, renders the final bonding composition elastic and pliable. Most preferably, it has been found that the use of polyisobutylene, having incorporated therein a powdered mixture of gelatin and carboxymethylcellulose, gives most satisfactory results. Pectin may also be present.

When the natural or synthetic viscous gum-like substances are employed in the practice of this invention, it may be desirable to employ plasticizers or solvents, such as mineral oil or petrolatum in combination therewith, to improve adherence characteristics and/or to provide the desired consistency.

In the practice of this invention, medicaments may be applied and retained on the affected areas on the body surfaces to be treated by the employment of the periodontal bandages prepared according to the present invention. For these purposes, the medicament may be applied on the surface of the bandage that will come in contact with the affected area to be treated or may be incorporated in the bonding composition of the bandage. The medicament may be applied to the surface of the bandage as by dusting, spraying or spreading. Among the medicaments which may be employed are included such substances as insulin, antibiotics, for example, amphotericin, tetracycline; anesthetics, such as benzocaine; anti-inflammatories, such as triamcinolone acetonide.

The following example illustrates the present invention without, however, limiting the same thereto.

EXAMPLE

| Ingredient | Amount |
| --- | --- |
| Beeswax, white | 45.0 g. |
| Piccolyte S 115 | 30.0 g. |
| kaolin | 24.0 g. |
| titanium dioxide | 1 g. |
| butylated hydroxyanisole | 0.2 g. |

The foregoing ingredients were combined in a vessel and heated with stirring at about 60° C. until a uniform molten mixture was obtained. The molten mixture was then spread in a uniform layer approximately 0.075 cm. (about 0.03 in.) thick over a sheet of bonding adhesive comprising a blend of a water soluble or swellable hydrocolloid admixed with a water insoluble viscous gum-like elastic binder. After the backing had solidified the sheet was cut into desired sizes.

What is claimed is:

1. A backing for a periodontal adhesive comprising by weight from about 40 percent to about 50 percent beeswax, from about 25 percent to about 30 percent terpene resin, and from about 20 percent to about 25 percent of a water-insoluble, fine powdered filler, the backing having secured to one surface thereof an adhesive, gum-like bonding composition comprising a blend of a water soluble or swellable hydrocolloid admixed with a water insoluble viscous gum-like elastic binder.

2. A backing according to claim 1 having secured to one surface thereof an adhesive, gum-like bonding composition comprising a blend of a water soluble or swellable hydrocolloid admixed with a water insoluble viscous gum-like elastic binder.

3. A backing according to claim 1 wherein the water soluble or swellable hydrocolloid is polyvinylalcohol, pectin, gelatin, carboxymethylcellulose, high molecular weight carbowax, or carboxypolymethylene.

4. A backing according to claim 1 wherein the elastic binder is natural rubber, silicone rubber, acrylonitrile rubber, polyurethane rubber, polyisobutylene or sucrose acetate isobutylate.

5. A backing according to claim 1 wherein the filler is kaolin.

6. A backing for a periodontal adhesive consisting essentially of by weight from about 40 percent to about 50 percent beeswax, from about 25 percent to about 30 percent terpene resin, and from about 20 percent to about 25 percent of a water-insoluble, fine powdered filler.

7. A backing according to claim 6 wherein the filler is kaolin.

8. A backing according to claim 6 consisting essentially of about 45 percent beeswax, about 30 percent terpene resin and about 24 percent kaolin.

* * * * *